US012240079B2

(12) United States Patent
Bunn, Sr.

(10) Patent No.: US 12,240,079 B2
(45) **Date of Patent: *Mar. 4, 2025**

(54) DEBURRING DEVICE

(71) Applicant: Keith R. Bunn, Sr., Grand Rapids, MI (US)

(72) Inventor: Keith R. Bunn, Sr., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,087

(22) Filed: Jul. 18, 2023

(65) Prior Publication Data

US 2023/0356347 A1 Nov. 9, 2023

Related U.S. Application Data

(63) Continuation of application No. 16/788,728, filed on Feb. 12, 2020, now Pat. No. 11,745,300.

(60) Provisional application No. 62/804,369, filed on Feb. 12, 2019.

(51) Int. Cl.
*B24B 9/00* (2006.01)
*B08B 9/02* (2006.01)

(52) U.S. Cl.
CPC .............. *B24B 9/007* (2013.01); *B08B 9/021* (2013.01); *B08B 2209/02* (2013.01)

(58) Field of Classification Search
CPC ...... B08B 2209/02; B08B 9/021; B24B 9/007
See application file for complete search history.

(56) References Cited

U.S. PATENT DOCUMENTS

| | | | | | |
|---|---|---|---|---|---|
| 3,335,526 | A * | 8/1967 | Weiss | B24B 9/007 | 451/180 |
| 5,020,221 | A * | 6/1991 | Nelson | B26D 3/169 | 30/169 |
| 2002/0095735 | A1* | 7/2002 | Yehia | B08B 9/021 | 15/104.095 |
| 2010/0031788 | A1* | 2/2010 | Gudleske | B24D 7/18 | 82/1.11 |
| 2010/0122423 | A1* | 5/2010 | Lozar | B23B 5/167 | 15/104.04 |

FOREIGN PATENT DOCUMENTS

| | | | | |
|---|---|---|---|---|
| CN | 105058185 | | 11/2015 | |
| CN | 105058185 | A * | 11/2015 | B24B 47/12 |
| GB | 2390051 | | 12/2003 | |
| GB | 2390051 | A * | 12/2003 | B23B 5/168 |

* cited by examiner

*Primary Examiner* — Douglas Lee
(74) *Attorney, Agent, or Firm* — Warner Norcross + Judd LLP

(57) ABSTRACT

A deburring device includes a cylindrical body with a receptacle for receiving a pipe. The cylindrical body includes an abrasive surface provided in the receptacle, which is configured to simultaneously deburr at least two surfaces of a pipe inserted into the receptacle.

20 Claims, 10 Drawing Sheets

DEBURRING DEVICE

The present application claims the benefit of U.S. non-provisional application Ser. No. 16/788,728 filed Feb. 12, 2020, entitled DEBURRING DEVICE, and further claims the benefit of provisional application No. 62/804,369 filed Feb. 12, 2019, entitled DEBURRING DEVICE, which is incorporated by reference herein in its entirety.

TECHNICAL FIELD AND BACKGROUND OF THE INVENTION

The present invention generally relates to a hand deburring device.

There are variety of hand tools used to deburr pipes. Common ways to deburr the cut end of a pipe are by using tools such as a file, a knife, sandpaper, or a pair of pliers. Using these tools to file or knock off burrs and then straighten the end of the pipe can be time consuming, inefficient, and potentially leave file ridges, nicks or grooves on the cut end of a pipe. For example, using the handle or the jaws of a pair of pliers to deburr the inner and outer edges of the cut end of a pipe can leave burrs that have not been scraped off or knocked off. In addition, this practice may leave the cut end around the outer and inner diameters of a pipe uneven by leaving file ridges, nicks or grooves caused by a filing motion, or by hitting or scraping the pipe. These imperfections can cause a seal to fail between the pipe and a coupler, or other fitting.

The plumbing industry widely uses plastic pipe, such as polyvinyl chloride (PVC), chlorinated polyvinyl chloride (CPVC), or polyethylene (PEX), or the like for plumbing installations in homes and commercial or industrial facilities. After a pipe is cut, the cut ends of two sections of pipes are joined together with a pipe fitting. To prevent the pipe from forming a leak, the pipe must be deburred uniformly on the cut end edges of the pipe. Consequently, the traditional means described above are typically too abrasive to use on plastic pipes.

SUMMARY OF THE INVENTION

Accordingly, the present disclosure describes a receptacle for receiving a pipe that can deburr a pipe. More specifically, the device can clean or smooth the outside surface of a pipe from imperfections and/or deburr the inner and outer edges of the cut end of a pipe, and/or reshape the cut end of the pipe into a uniform tapered, bullnose or rounded end. The deburring device described herein is an improvement over other deburring devices because it can allow a workman to perform two or more different functions with one device, for example, to provide uniformity and efficiency in the deburring process, remove imperfections on the outside of the pipe, and/or deburr and reshape the cut end of a pipe.

In one embodiment, a deburring device includes a cylindrical body with a receptacle for receiving a pipe. The deburring device includes an abrasive surface provided in the receptacle, which is configured to simultaneously deburr at least two surfaces of a pipe inserted into the receptacle.

In one aspect, the cylindrical body is a monolythic cylindrical body.

In any of the above devices, the cylindrical body may include an internal surface inserted, imbedded, sprayed, bonded, woven, or infused with an abrasive material to form the abrasive surface.

In any of the above devices, the cylindrical body may include an internal surface in the receptacle formed with the abrasive surface. For example, the internal surface is a knurled surface.

In any of the above devices, the cylindrical body may include a round cylindrical body.

In any of the above devices, the cylindrical body may include a ceramic cutting edge impregnated into the cylindrical body.

In any of the above devices, the cylindrical body may include an exterior surface adapted to assist in manual use of the deburring device. For example, the exterior surface may include an abrasive material or an abrasive surface formed therein.

In any of the above devices, the cylindrical body may include an exterior surface adapted to assist in a tool or equipment engaging the deburring device. For example, the exterior surface may include planar regions or notches to facilitate engagement of the deburring device.

In another embodiment, a deburring device includes a cylindrical body with a receptacle for receiving a pipe. The cylindrical body further includes an annular channel in the receptacle and an abrasive surface provided in the channel for simultaneously deburring at least two surfaces of a pipe inserted therein.

In another aspect, the cylindrical body includes a monolythic cylindrical body.

In another embodiment, the deburring device includes a channel with an abrasive material inserted, imbedded, sprayed, bonded, woven, or infused therein or thereon to form the abrasive surface.

In yet another embodiment, the channel includes a surface formed with the abrasive surface.

In any of the above devices, the cylindrical body may include an outer surface, such as an abrasive surface or a planar surface, to assist in manual use of the deburring device or to assist in a tool or equipment engaging the deburring device.

In any of the above devices, the cylindrical body may include an open upper end and a closed lower end with the channel located at the lower end.

In any of the above devices, the cylindrical body may include a cylindrical perimeter wall and a recessed central wall at the lower end of the cylindrical body, with the annular channel being defined between the central wall and the perimeter wall.

In any of the above devices, the cylindrical body may include at least one passageway extending from the receptacle to the exterior of the cylindrical body to allow debris to exit from the deburring device.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of “including” and “comprising” and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

IN THE DRAWINGS

DETAILED DESCRIPTION OF THE PREFERRED EMBODIMENTS

Figure 1:
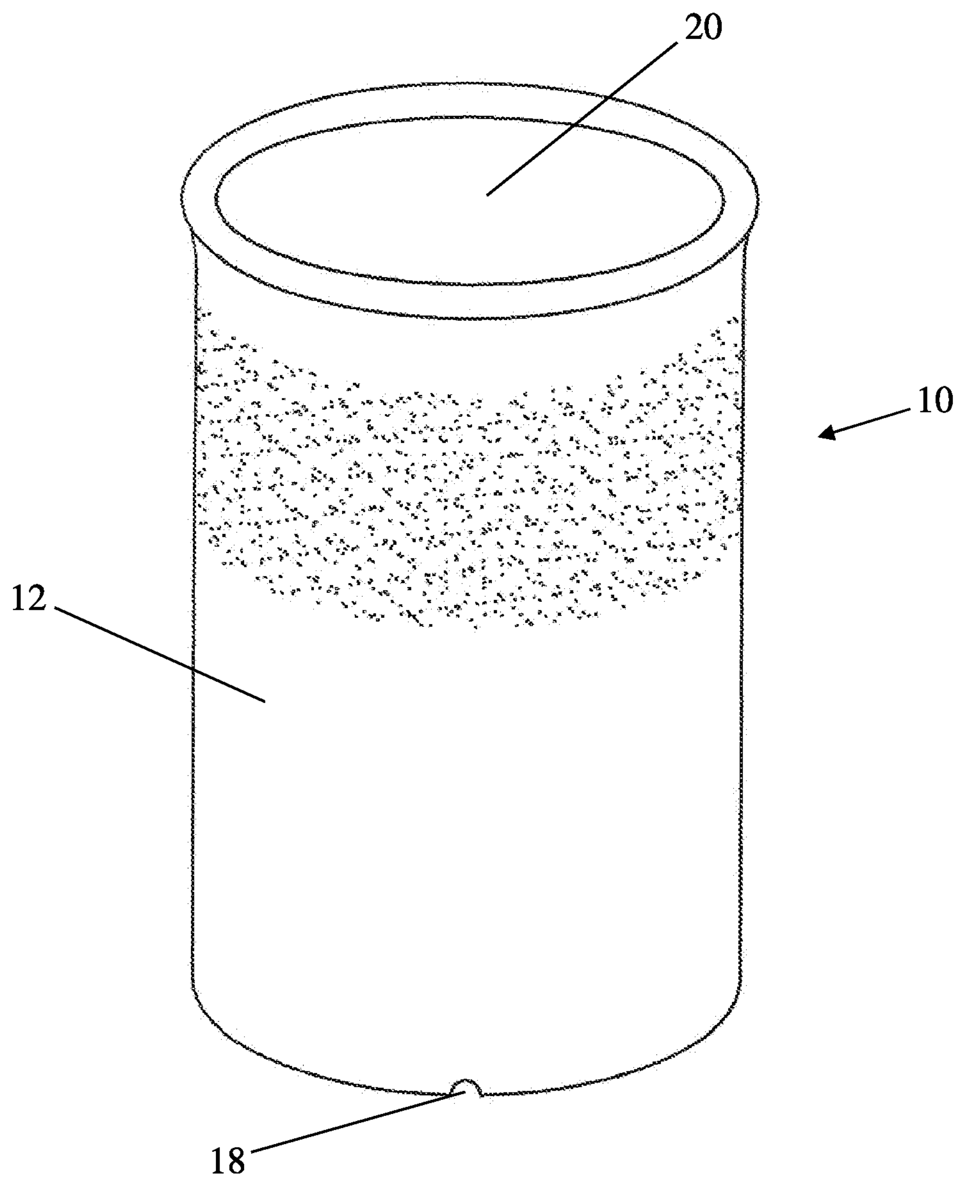
FIG. 1 is a perspective view of the deburring device.

Referring to FIG. 1, the numeral 10 generally designates a deburring device. As will be more fully described below, the deburring device 10 is configured to receive a pipe for the purpose of uniformly and, optionally, simultaneously deburring the cut end to clean and/or remove imperfections on the outside of the pipe, and optionally to reshape the cut end of a pipe.

In the illustrated embodiment, deburring device 10 is constructed as a one-piece body from a material or materials, such as metal (e.g., aluminum), nickel alloy, steel (e.g., cold rolled steel), or other ferrous materials including sheet metal, tubing, solid rod, plastic, ceramic, or open web materials and may be formed by either molding, including plastic injection molding, welding, casting, or machining, including machining with a CNC machine, or any other desired manufacturing process. However, it should be understood that deburring device 10 may be formed or assembled from multiple components.

Figure 2:
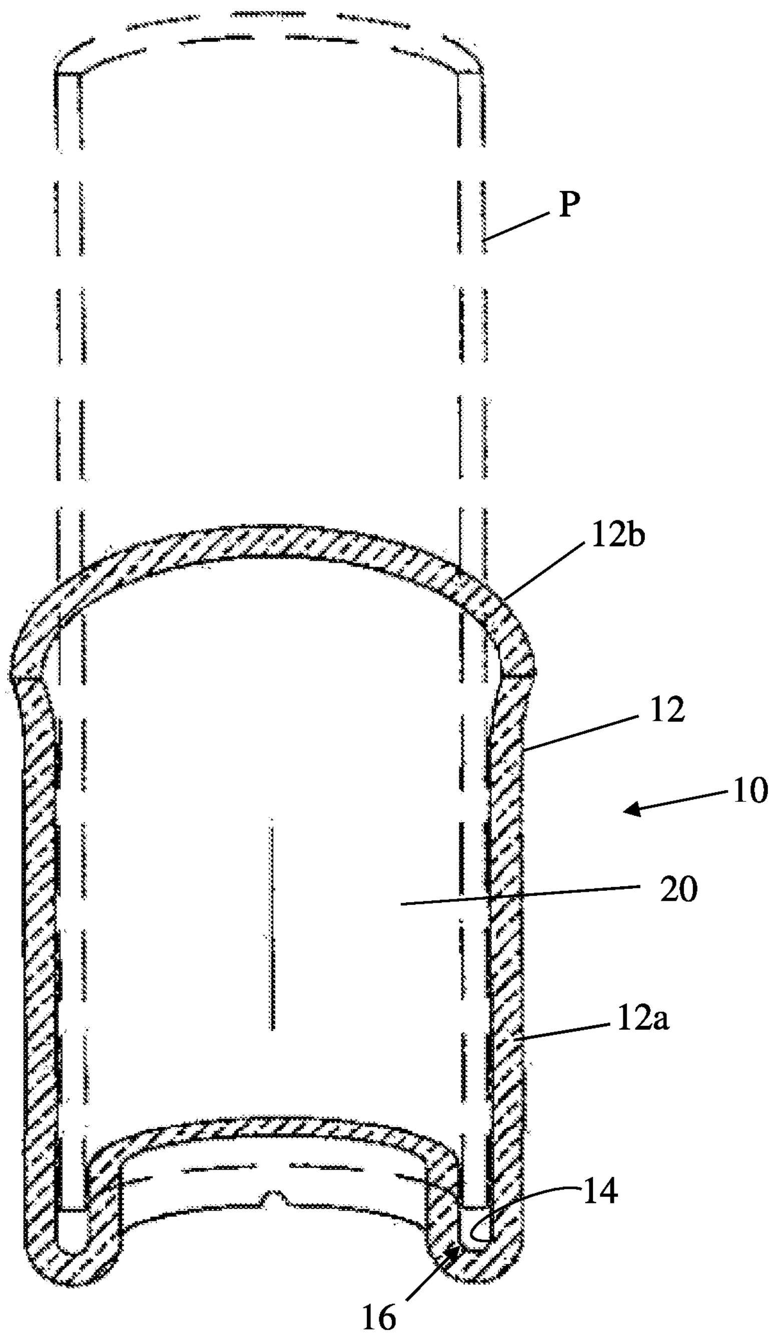
FIG. 2 is a cross-section view thereof, illustrating a pipe inserted into the device.

Referring to FIG. 2, the deburring device 10 includes a cylindrical body 12, which forms a receptacle 20. Cylindrical body 12 includes an abrasive surface 14 for deburring a pipe inserted into the receptacle 20 on at least two surfaces, for example the outside of the pipe and/or edges of the pipe at the pipe's distal end. In the illustrated embodiment, abrasive surface 14 is located in an annular channel 16 formed or located, for example, at the lower end of cylindrical body 12 in receptacle 20.

The abrasive surface 14 may be formed from abrasive materials, such as metal pieces, ceramic cutters, micro-honeycomb cutters, knives, sand, diamonds, carbide cutters, or may be formed from knurled surfaces. The abrasive surface may be from by abrasive material inserted, imbedded, sprayed, bonded, woven, or infused on or in the cylindrical body 12 on either side of channel 16. For example, the abrasive surface may be provided in the form of a knurled surface. As will be more fully described below, the abrasive surface may be located so that it uniformly deburrs the inner and outer edges of the cut end of the pipe, while simultaneously removing imperfections from the outer or external surface of the pipe to make it completely smooth, and, if desired, reshaping the cut end of the pipe to form a tapered, bullnose or rounded cut end, such as shown in FIG. 2C.

Referring again to FIG. 2A, device 10 may be formed with outer cylindrical wall 12*a* and an inner cylindrical wall 12*c*, which is spaced inwardly from outer cylindrical wall 12*a* and recessed into receptacle 20 to thereby form annular channel 16 there between. Inner cylindrical wall 12*c* may be solid or may also include one or more passageways to allow debris to be ejected from device 10, as described below. The abrasive surface may be formed on the inside surface of outer cylindrical wall 12*a* or inner cylindrical wall 12*c* or both. Further, the lower end of outer cylindrical wall 12*a* may be angled inwardly to form a tapered inner surface, as best seen in FIG. 5A.

Figure 2A:
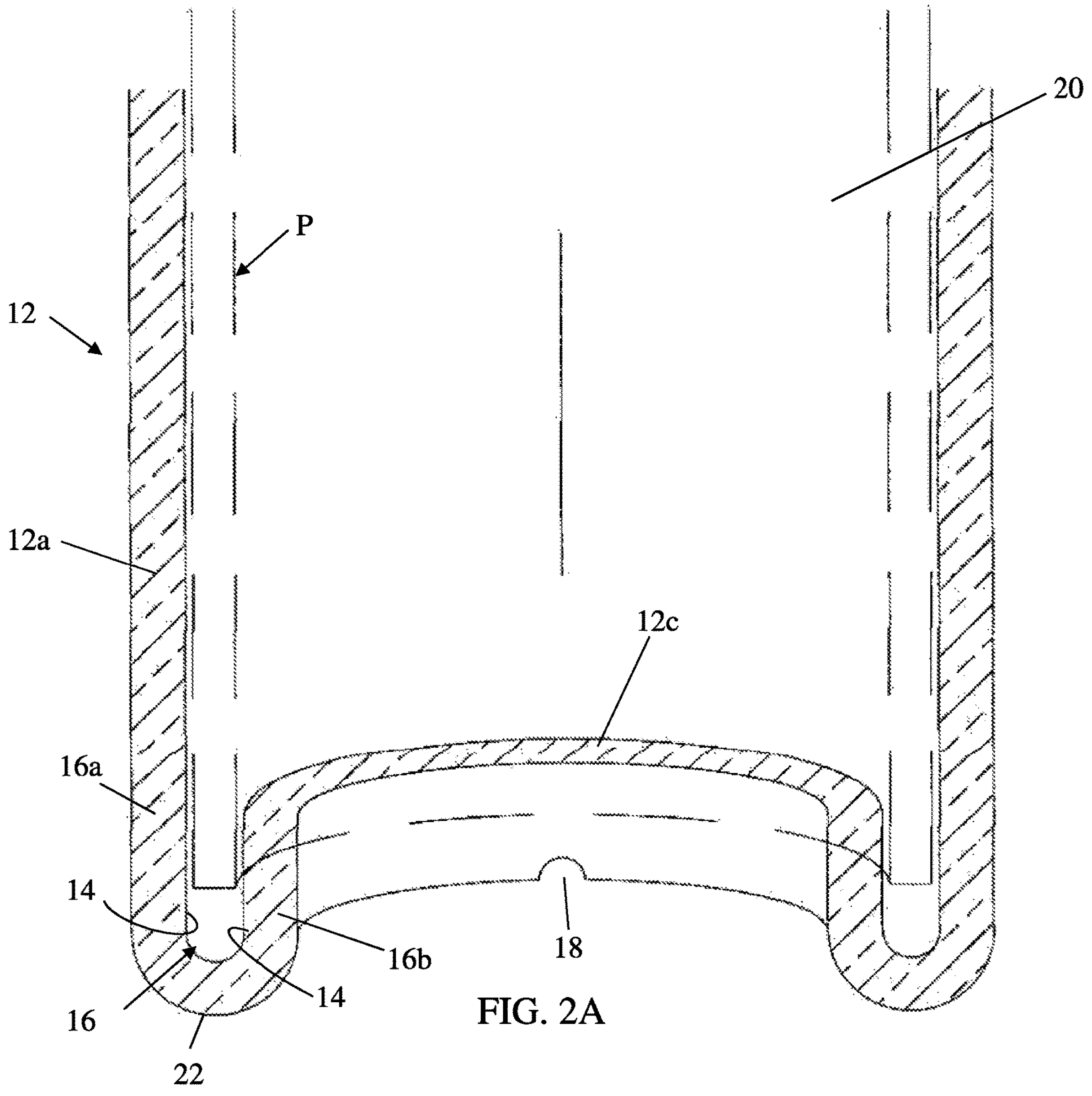
FIG. 2A is an enlarged cross-section view similar to FIG. 2.
Figure 2B:
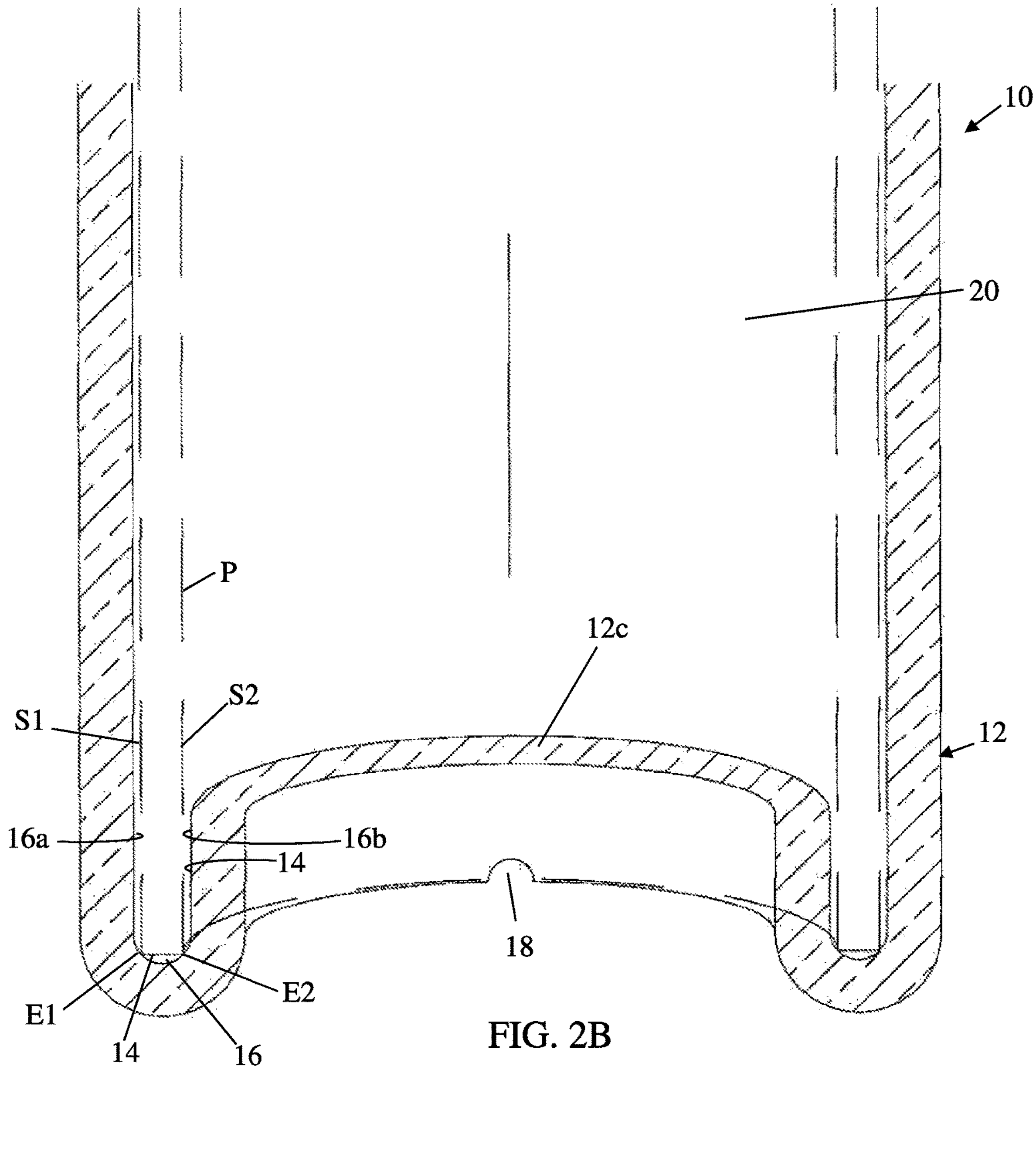
FIG. 2B is a similar view to FIG. 2A illustrating the pipe fully inserted into the device.
Figure 2C:
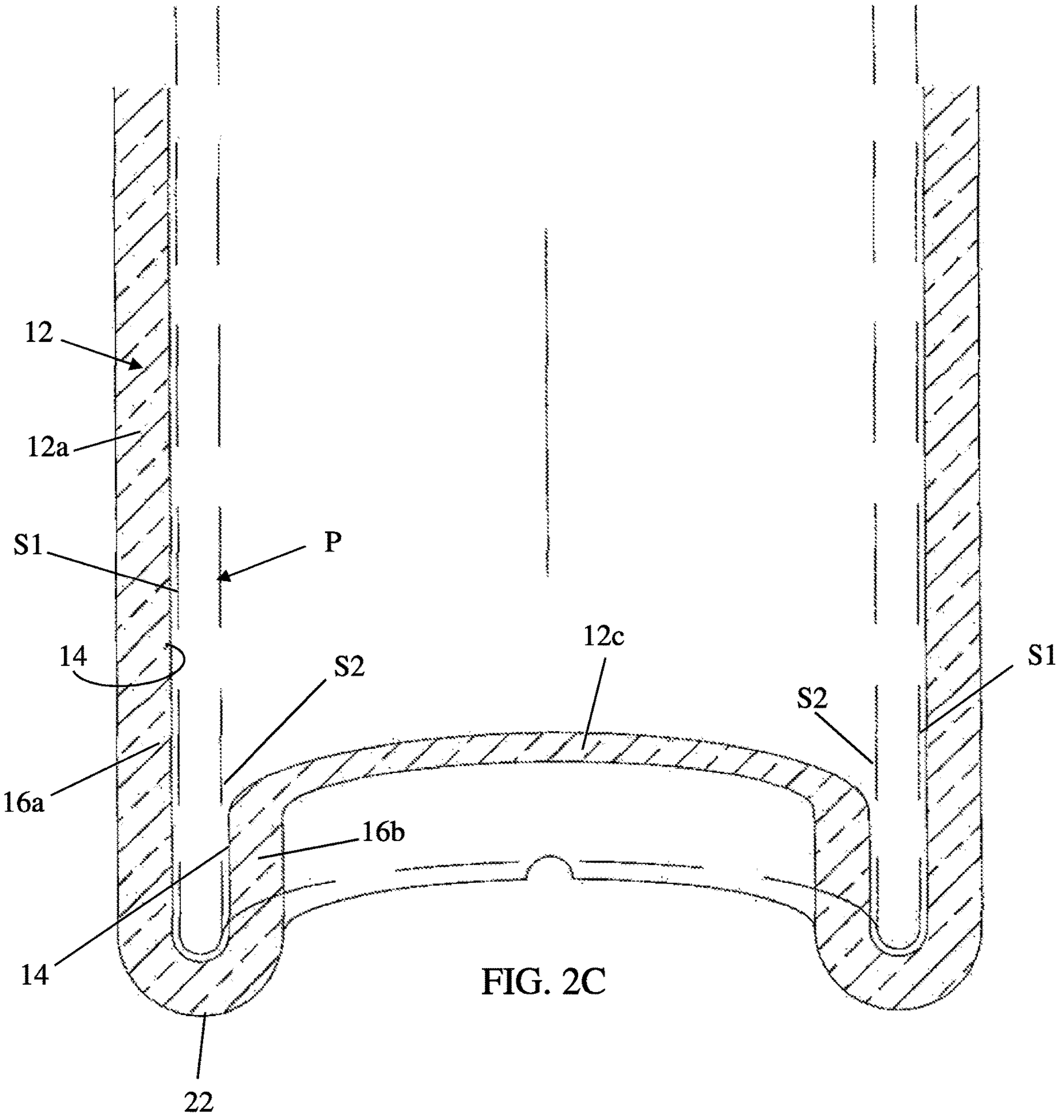
FIG. 2C is a similar view to FIG. 2B illustrating the pipe formed with a rounded distal end.

Referring to FIGS. 2A-2C, annular channel 16 may be sized and shaped (e.g., have a curved or arcuate lower surface) so that the end of the pipe P can be freely and fully inserted into the channel 16 (see also FIG. 5B) and optionally only make contact with abrasive surface 14 at its distal edges E1 and E2 (see e.g., FIG. 2B). As the pipe P is pushed and turned in receptacle 20, edges E1 and E2 will, therefore, contact abrasive surface 14 so that edges E1 and E2 will be deburred and, optionally, reshaped such as shown in FIG. 2C. Alternately, the lower surface of annular channel 16 may be generally flat so that when a pipe is rotated in device 10, the pipe's distal end will remain generally flat after cleaning. As will be more fully described below, the other option is to insert the pipe into the receptacle so that it is only partially inserted into the channel, so that only the outer or exterior surfaces of the pipe may contact with the abrasive surface.

Alternately, channel 16 may be sized so that there is little or no gap between pipe P and inwardly facing side 16*b* of channel 16 (which is formed at the lower end of inner cylindrical wall 12*c*) and outwardly facing side 16*a* of channel 16 (which is formed by outer cylindrical wall 12*a*). Optionally, similar to as described above, the pipe P may be fully inserted into the channel so that edges E1 and E2 as well as the inner and outer pipe wall surfaces S1 and S2 of pipe P will be deburred by abrasive material 14, with edges E1 and E2 optionally being reshaped as well after the pipe has been rotated in device 10.

Optionally, as noted above, the pipe P need not be fully inserted in to receptacle 20 so that only outer and inner wall surfaces S1 and S2 of pipe P are deburred by the abrasive surface formed at sides 16*a*, 16*b* of channel 16.

In the illustrated embodiment, cylindrical body 12 may include passageways 18 formed therein to allow debris from the deburring process to exit device 10. The number and location of passageways 18 may vary, but in the illustrated embodiment comprise four passageways spaced equally around annular channel 16 at opposed sides of cylindrical body 12, for example, at 12 o'clock, 3 o'clock, 6 o'clock, and 9 o'clock. Passageways 18 may be round, and formed, for example, by drilling or may be formed during the forming process of cylindrical body 18.

The depth of channel 16 may vary and depends on the size of the pipe and area of pipe to be deburred. For example, the depth of the channel 16 may fall in a range about 3/16 to 5/16 inches, 1/4 to 3/8 inches, or 7/16 to 9/16 inches.

While illustrated with a generally solid annular channel 16 with four passageways 18 (FIG. 3), channel 16 may have fewer or more than four passageways, for example, formed by drilled holes or cuts formed therein to form discrete spaced sections of wall there between to increase the flow of debris exiting from the device. Further, as described in reference to FIG. 5A, cylindrical body 12 may include one or more larger and/or longer passageways formed by cuts 40 to ease manufacturing of the device, which also allow debris to exit from the channel.

Figure 3:
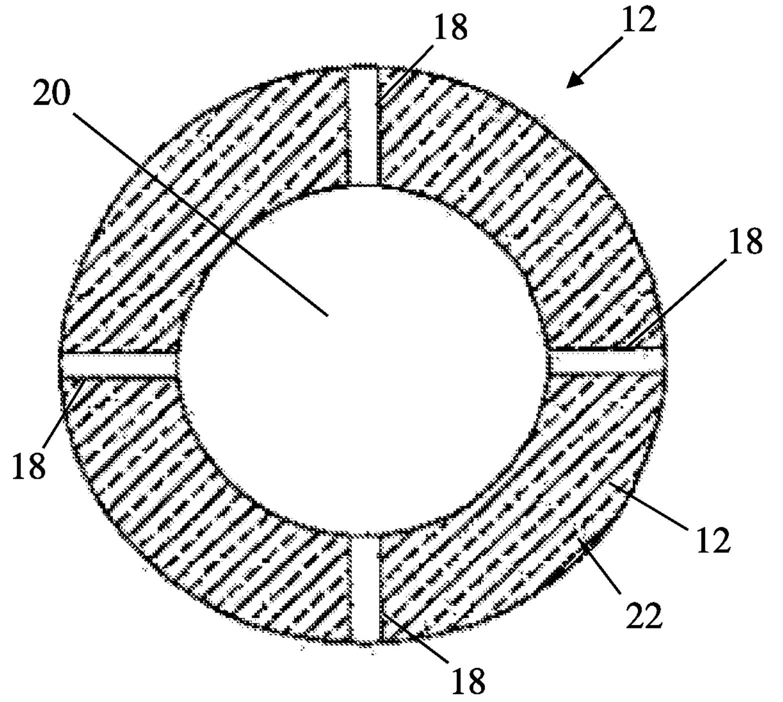
FIG. 3 is a cross-section taken through the device of FIG. 1.
Figure 4:
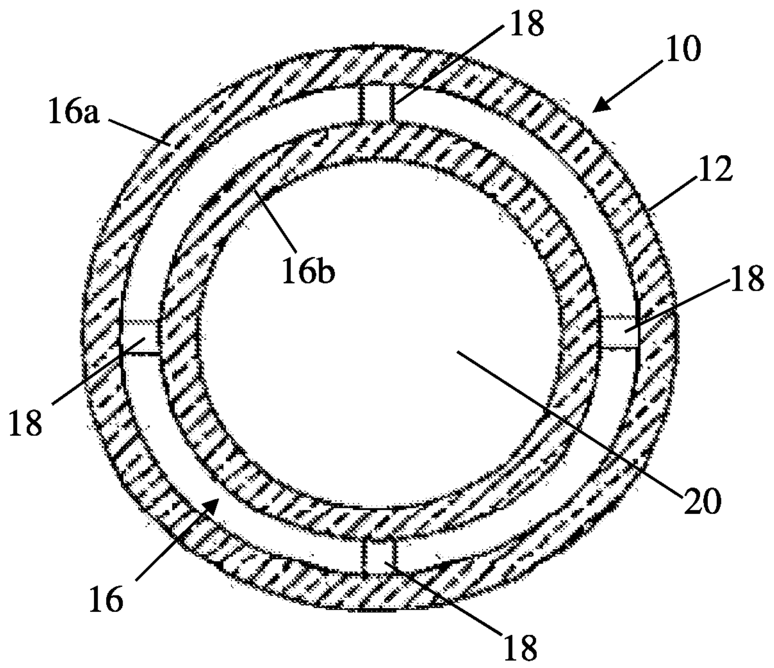
FIG. 4 is another cross-section taken through the device of FIG. 1.

Referring again to FIG. 2A, the lower end of cylindrical body 12 may be formed with rounded rim 22, which joins outer and inner cylindrical walls 12*a* and 12*c*, and which forms the bottom of channel 16. Referring to FIG. 3, passageways 18 may extend through the rim 22 and extend up into channel 16 through the rim 22, as noted, so as to provide paths for debris to exit from device 10.

Figure 5:
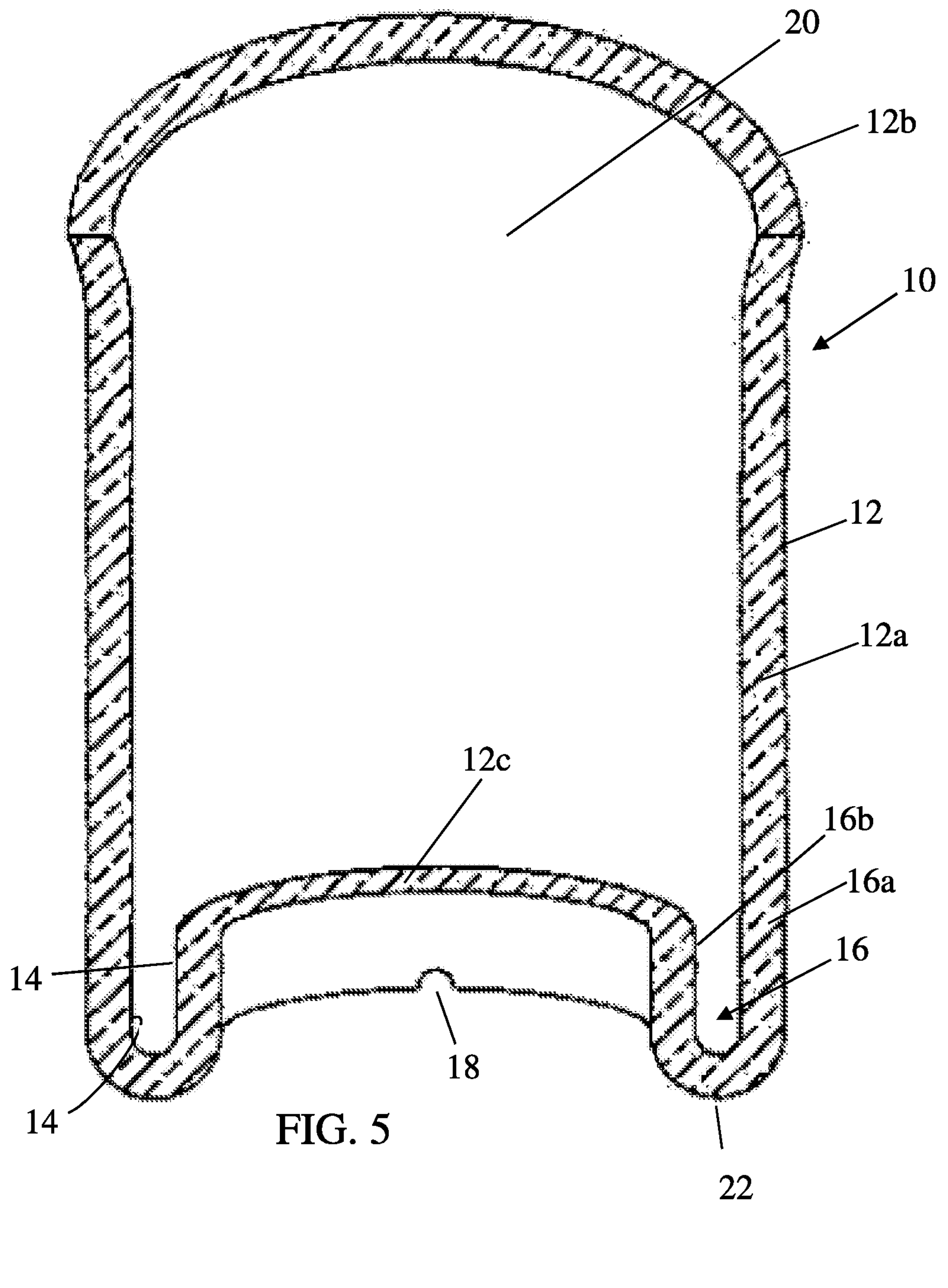
FIG. 5 is a similar view to FIG. 2 with the pipe removed.
Figure 5B:
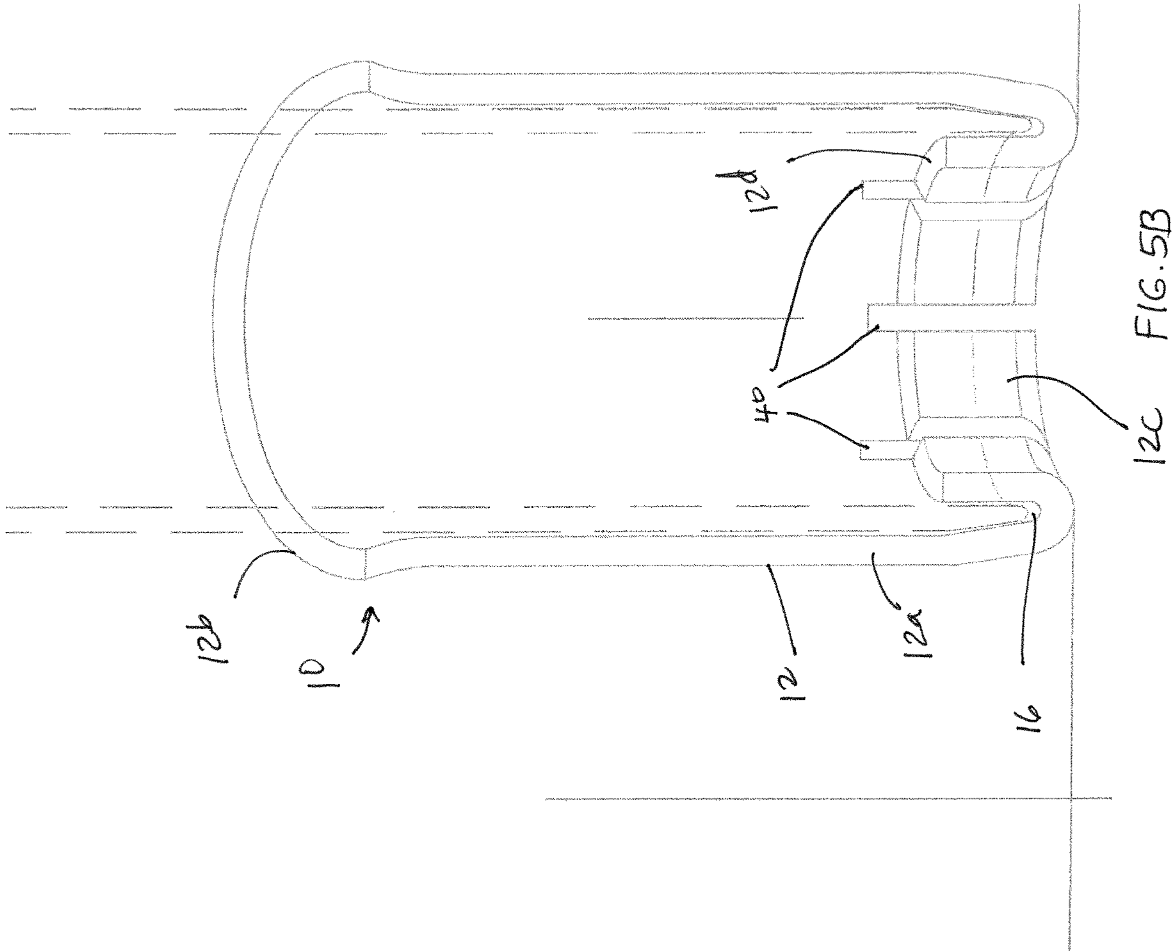
FIG. 5B is a similar view to FIG. 5A illustrating a pipe fully inserted into the device.
Figure 5A:
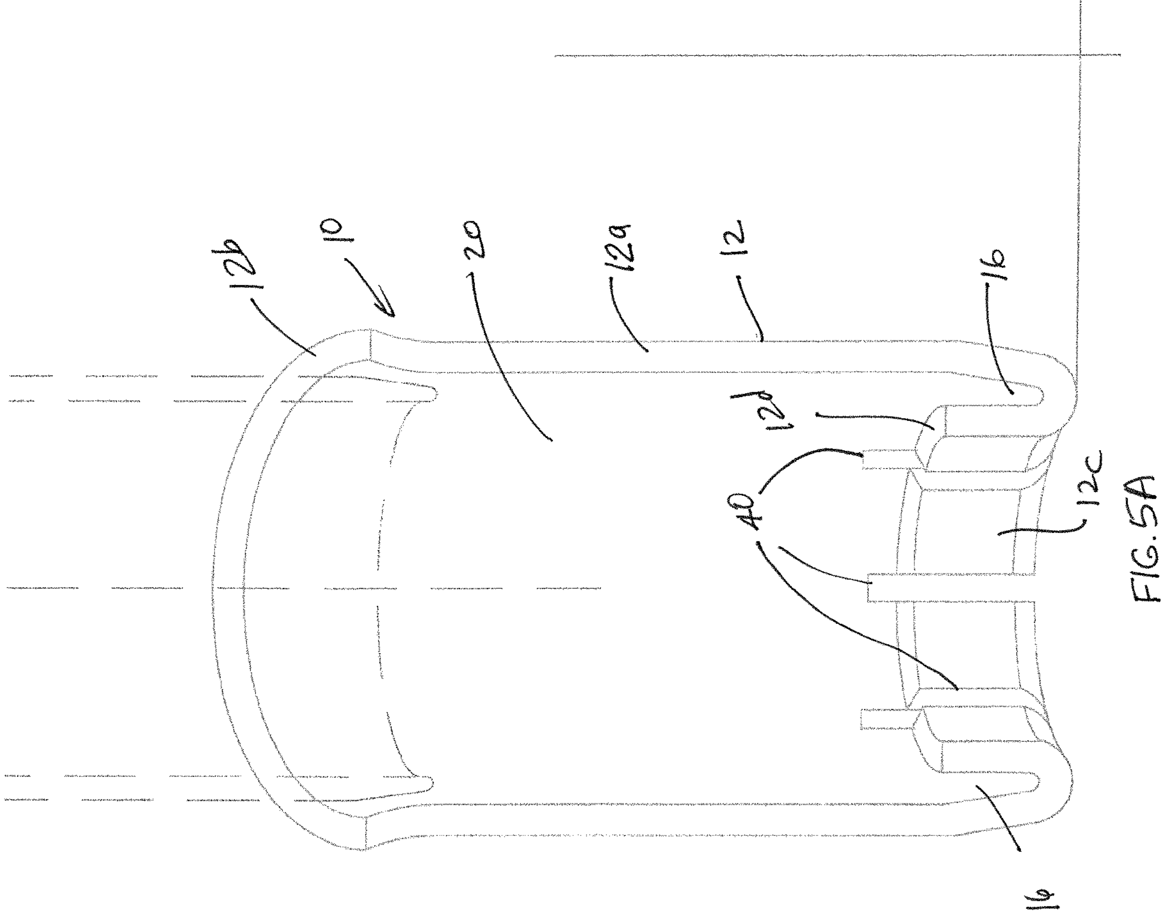
FIG. 5A is a similar view to FIG. 5 illustrating a modified device one or more cuts made in the wall of the device.
Figure 5D:
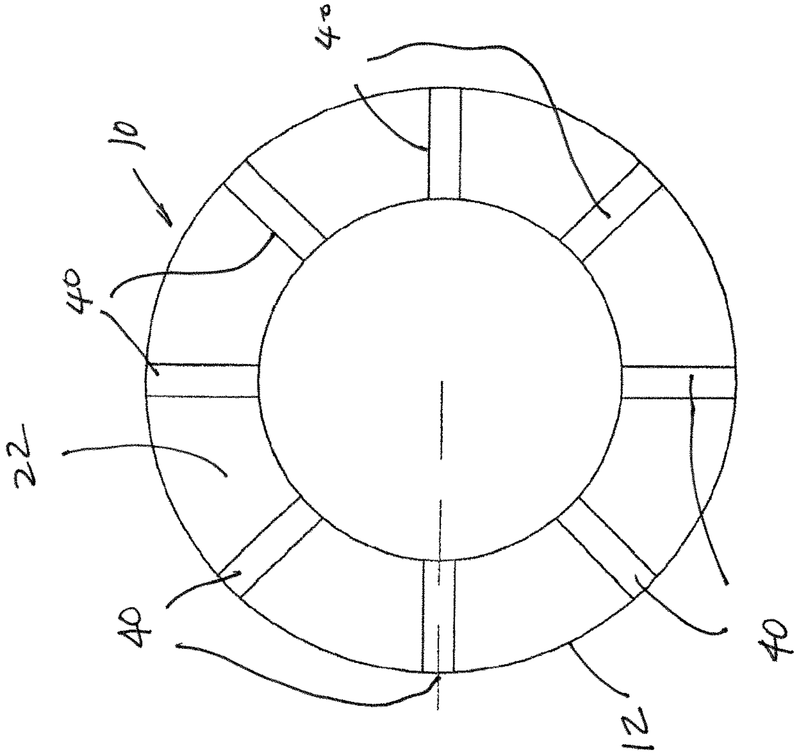
FIG. 5D is a bottom plan view of the device of FIG. 5A.
Figure 5C:
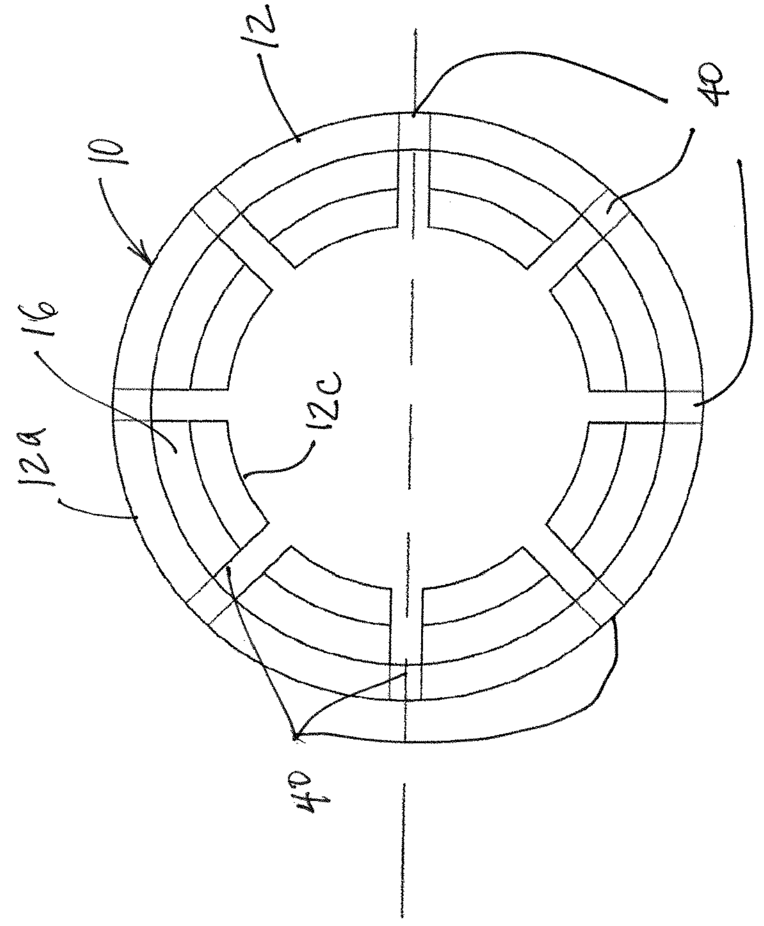
FIG. 5C is a top plan view of the device of FIG. 5A.

Optionally, as noted and best seen in FIGS. 5A-5D, the lower end of cylindrical body 12 may include longer passageways in the form cuts 40 that extend up into the rim (optionally on the inside and/or outside cylindrical walls), which can facilitate manufacturing of the device. These may be in place of the passageways 18 (as shown) or in addition to the passageways 18. The cuts 40 may extend partially up the inner cylindrical wall or extend to its upper free edge 12*d* (FIGS. 5A and 5B). On the outside cylindrical wall 12*a*, these cuts 40 may extend above the free edge of the inner cylindrical wall.

Still further, device 10 may be configured as a hand tool that is simple to construct, inexpensive, and capable for anyone to use without any special skill. Simplification in the construction of the invention makes it inexpensive to produce because it has no moving parts, is self-aligning, and is self-cleaning. These aspects increase the longevity and reliability of the invention. In addition, the device can easily be carried by a workman, and may be sized to fit in a work belt or pocket.

As would be understood from FIGS. 2, 2A, and 2B, when a pipe is inserted into device 10, device 10 will deburr the outer and inner edges of the cut end of the pipe. These edges may be straight or flat or may be rounded or tapered (as shown in FIG. 5B). Once deburred, the pipe will have a clean end to allow a coupler with a gasket, or other fitting, to be connected to the pipe end without damaging the gasket.

If a straight or flat cut end is preferred on the pipe, as noted above, the workman may simply insert the pipe into the body and seat it in the receptacle 20. The workman may then slightly back the pipe out of the receptacle 20 so that the pipe is no longer fully seated in the receptacle. The workman can then rotate the body a few times to uniformly remove imperfections from the external surface of the pipe, such as generally shown in FIG. 2A and depending on the depth optionally simultaneously deburr the inner and outer edges of the cut end of the pipe.

Thus, if the cut end of a pipe is cut on an angle, or is not perfectly straight, the receptacle can straighten the cut end by reshaping it into a tapered, bullnose or rounded end, or flat end depending on the shaped of the channel. Before a pipe can be properly joined to a coupler with a gasket, or other fitting, it is preferred to be level and smooth on the external surface of the pipe. Again in this instance, the workman may fully insert the pipe into the cylindrical body and seat it fully in the channel. The workman then rotates the body several times, or until the workman no longer feels any resistance from the pipe, and until the cut end of the pipe has become its desired shape. Again, this allows ease of insertion of the pipe into a coupler with a gasket, or other fitting, preventing any damage to the gasket.

Consequently, it can be appreciated that the device can also be used as a leveling tool in addition to removing imperfections on the external surface of the pipe, which can otherwise prevent a gasket from forming a tight, leak-proof seal against the pipe.

To facilitate insertion of a pipe into device 10, cylindrical body 12 may include a flared rim 12*b* at its upper end. Further, flared rim 12*b* reduces the likelihood of a groove being created on the pipe as the pipe is turned in device 10.

Figure 6:
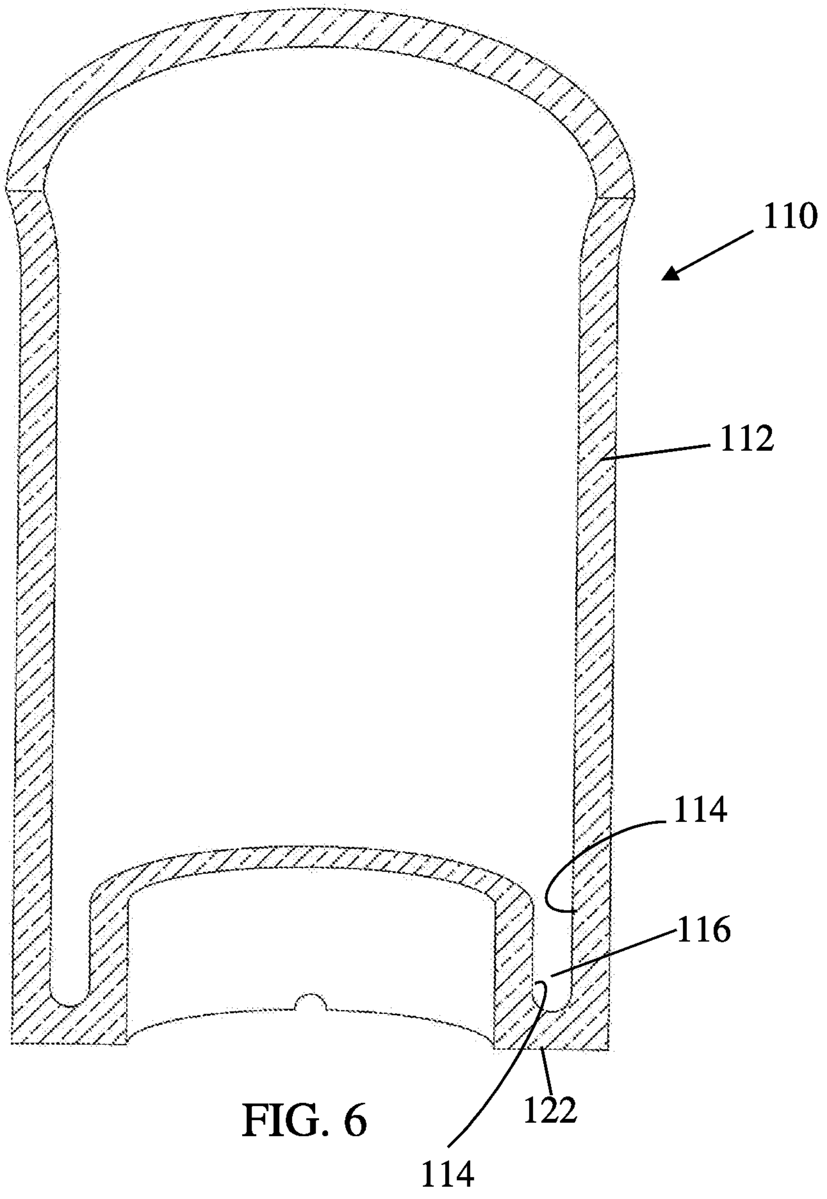
FIG. 6 is a cross-section of an alternate embodiment of a deburring device.

Referring to FIG. 6, the numeral 110 designates another embodiment of a deburring device. Deburring device 110 is of similar construction to deburring device 10 but includes a planar annular surface 122 at the lower end of cylindrical wall 112 above which channel 116 is formed and with abrasive material 114 similarly located in channel 116. In this manner, device 110 may be made from a solid stock of material, for example, using CNC, end mills to remove the material to form and shape cutting channel at the lower end of cylindrical body. The passageways can then be drilled or cut into the cylindrical body 112 to allow debris to exit the device. For further details of cylindrical body 112, abrasive material 114, and channel 116 reference is made to the above embodiments.

In any of the above, the abrasive material may also be provided on the outside of the cylindrical body of the devices described herein to allow a workman to manually grip the body for ease in rotating it without slipping.

Alternately or in addition, the outside shape or surface of the cylindrical body of the devices described herein may have two or more flat regions or indentations to allow a worker to grasp the device. For example, in one embodiment the cylindrical body may be formed from a poly-sided cylindrical body so that it has two or more planar surfaces to facilitate either manual operation of the device or so that it can be engaged by a tool or machine.

Therefore, the deburring devices, as noted, may be configured as a hand cleaning, reshaping, and deburring device that will simultaneously deburr at least two surfaces, such as the inner and outer cut end edges, of a pipe uniformly to thereby remove imperfections from the external surface of a pipe that may have been created during manufacturing, and, optionally, to reshape an irregular cut end of a pipe into a tapered, bullnose or rounded shape, or flat shape, if desired.

In another embodiment, the outer surface of the cylindrical body of any of the above devices may include other structures for engagement by a tool or machine. For example, the cylindrical body may include one or more flat regions or notches for engagement by a tool or machine.

Alternately, or in addition, the cylindrical body may be formed with or fitted with a shaft extending, for example, from its central lower wall, to allow the deburring device to be used with a power unit, such as a drill, including a cordless drill.

Consequently, the deburring devices described herein may increase efficiency in the installation process by uniformly deburring the inner and outer edges of the cut end of a pipe to provide a uniform cut end on the pipe.

It should be understood the embodiments described herein may be used to deburr pipes made from a wide variety of wall thicknesses and diameters, and a wide variety of materials.

With respect to the description of the present disclosure, it is to be understood that any changes in the construction of the devices, as illustrated and described herein, may be made within the scope or range of the claims without changing the concept of the present disclosure.

Directional terms, such as “vertical,” “horizontal,” “top,” “bottom,” “upper,” “lower,” “inner,” “inwardly,” “outer” and “outwardly,” are used to assist in describing the invention based on the orientation of the embodiments shown in the illustrations. The use of directional terms should not be interpreted to limit the invention to any specific orientation(s).

The above description is that of current embodiments. Various alterations and changes can be made without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present disclosure is not limited to only those embodiments that include all of these features or that provide all of the stated benefits, except to the extent otherwise expressly set forth in the issued claims. Any reference to claim elements in the singular, for example, using the articles “a,” “an,” “the” or “said,” is not to be construed as limiting the element to the singular. Any reference to claim elements as “at least one of X, Y and Z” is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A deburring device for deburring a pipe, the pipe having a distal insertion end, and said deburring device comprising:

a cylindrical body, said cylindrical body having a cylindrical wall forming a receptacle for receiving a portion of the pipe therein and having an inner wall spaced radially inward from said cylindrical wall and forming an inner channel between said inner wall and said cylindrical wall for receiving the distal insertion end of the pipe, said inner wall including a central passageway radially inward of said inner channel and of said inner wall, said central passageway being in communication with said receptacle; and a cutting edge provided in said receptacle and at said inner wall of said inner channel and configured to simultaneously deburr at least two surfaces of the distal end of the pipe when inserted into said receptacle and into said inner wall, wherein said central passageway and said receptacle form a through passageway through said cylindrical body to allow debris to pass through said cylindrical body when deburring the pipe.

2. The deburring device according to claim 1, wherein said inner wall is a curved inner annular wall, and wherein said inner channel is an inner annular channel.

3. The deburring device according to claim 1, wherein said cutting edge is a carbide cutter.

4. A deburring device according to claim 1, wherein said cylindrical body comprises a monolythic cylindrical body.

5. The deburring device according to claim 1, wherein said inner wall includes a surface formed with an abrasive material to form said abrasive surface.

6. The deburring device according to claim 1, wherein said cylindrical body comprises a round cylindrical body.

7. The deburring device according to claim 1, wherein said cutting edge includes a ceramic cutting edge impregnated into said inner wall.

8. The deburring device according to claim 1, wherein said cylindrical body has an exterior surface adapted to assist in manual use of said deburring device.

9. The deburring device according to claim 1, wherein said cylindrical body has an exterior surface adapted to assist in a tool or equipment engaging said deburring device.

10. A deburring device comprising:

a cylindrical body, said cylindrical body having a cylindrical wall extending from a first end to a second end thereof and forming a receptacle for receiving a pipe through said first end, said cylindrical body including a through passageway extending through said cylindrical body from said first end to said second end;

said cylindrical wall being configured to form a channel in said receptacle to receive a distal end of the pipe, said channel configured to extend into the distal end of the pipe when the pipe is inserted into said receptacle and into said channel, said channel extending radially about said through passageway; and a cutting edge provided in said channel for simultaneously deburring at least two surfaces of the pipe inserted therein, wherein debris from deburring the pipe can pass through said second end of said cylindrical body.

11. The deburring device according to claim 10, wherein said cutting edge is a carbide cutter.

12. The deburring device according to claim 10, wherein said cylindrical body comprises a monolythic cylindrical body.

13. The deburring device according to claim 10, wherein said channel includes an annular wall impregnated with said cutting edge.

14. The deburring device according to claim 10, wherein said cylindrical body comprises a round cylindrical body.

15. The deburring device according to claim 10, wherein said cutting edge includes a ceramic cutting edge impregnated into said cylindrical body.

16. The deburring device according to claim 10, wherein said cylindrical body has an outer surface, said outer surface includes an abrasive surface or a planar surface to assist in manual use of said deburring device.

17. The deburring device according to claim 10, wherein said cylindrical body has an outer surface with a notch to assist in a tool or equipment engaging said deburring device.

18. The deburring device according to claim 10, wherein said channel is located at said second end.

19. The deburring device according to claim 18, wherein said cylindrical wall forms a perimeter wall and an inner wall spaced inwardly from said perimeter wall at said second end of said cylindrical body, and said channel being defined between said inner wall and said perimeter wall.

20. The deburring device according to claim 19, wherein said channel includes at least one passageway extending from said receptacle to an exterior of said cylindrical body to allow debris to exit therefrom.

* * * * *